(12) United States Patent
Gower et al.

(10) Patent No.: US 9,510,064 B2
(45) Date of Patent: Nov. 29, 2016

(54) VIDEO DATA PROVISION

(71) Applicant: BRITISH TELECOMMUNICATIONS PUBLIC LIMITED COMPANY, London (GB)

(72) Inventors: Andrew Peter Gower, London (GB); Stephen Howard Johnson, London (GB)

(73) Assignee: BRITISH TELECOMMUNICATIONS PUBLIC LIMITED COMPANY, London (GB)

(*) Notice: Subject to any disclaimer, the term of this patent is extended or adjusted under 35 U.S.C. 154(b) by 0 days.

(21) Appl. No.: 14/772,635

(22) PCT Filed: Jan. 31, 2014

(86) PCT No.: PCT/GB2014/000036
§ 371 (c)(1),
(2) Date: Sep. 3, 2015

(87) PCT Pub. No.: WO2014/135826
PCT Pub. Date: Sep. 12, 2014

(65) Prior Publication Data
US 2016/0014479 A1 Jan. 14, 2016

(30) Foreign Application Priority Data

Mar. 5, 2013 (EP) .................................... 13250024

(51) Int. Cl.
*H04N 7/173* (2011.01)
*H04N 21/84* (2011.01)
(Continued)

(52) U.S. Cl.
CPC .......... *H04N 21/84* (2013.01); *G06K 9/00765* (2013.01); *G11B 27/031* (2013.01);
(Continued)

(58) Field of Classification Search
CPC .......... H04N 21/4331–21/4335; G11B 27/002
USPC .................................. 725/87, 100, 131–134
See application file for complete search history.

(56) References Cited

U.S. PATENT DOCUMENTS 7,831,112 B2 11/2010 Wang et al.
7,983,442 B2 7/2011 Chiang et al.
(Continued)

FOREIGN PATENT DOCUMENTS

EP 1421780 5/2004
EP 1 968 066 9/2008
(Continued)

OTHER PUBLICATIONS

Gower et al, U.S. Appl. No. 14/772,872, filed Sep. 4, 2015 (WO 2014/135827).
International Search Report for PCT/GB2014/000036, mailed Apr. 23, 2014, 3 pages.

*Primary Examiner* — Dominic D Saltarelli
(74) *Attorney, Agent, or Firm* — Nixon & Vanderhye PC

(57) ABSTRACT

Video clips are generated from a sequence of video data for delivery and playback on demand. Each clip (101, 102, 103) is identified by an event marker (1) and a pre/post event ratio (PPER). The pre/post event ratio determines the relative duration of the clip before and after the element defined by the event marker. In response to a request for video clip data, identified with reference to the event marker (1), the discrete elements (1, 2, 3, 12) of video data making up each clip are allocated to a sequence starting with the element associated with the event marker (1) and following in an order (2, 3, 4, etc) determined by the pre/post event ratio. This allows clips having different durations but having the same PPER to be transmitted to different receivers dependant on channel capacity or reliability. The receiver may compile clips of a selected length by compiling the elements starting at the event marker and adding the elements in a sequence, before and after the event marker, determined by the PPER until a clip of a required length is complete. A sequence of several clips can be compiled, the event markers for different clips having different priorities such that if a short sequence is required, the low priority clips are omitted or abbreviated.

15 Claims, 6 Drawing Sheets

(51) Int. Cl.
- *H04N 21/234* (2011.01)
- *H04N 21/8549* (2011.01)
- *G11B 27/031* (2006.01)
- *G11B 27/32* (2006.01)
- *G06K 9/00* (2006.01)
- *H04N 21/2385* (2011.01)
- *H04N 21/239* (2011.01)
- *H04N 21/433* (2011.01)
- *H04N 21/437* (2011.01)
- *H04N 21/482* (2011.01)

(52) U.S. Cl.
CPC ......... *G11B27/322* (2013.01); *H04N 21/2385* (2013.01); *H04N 21/2393* (2013.01); *H04N 21/23418* (2013.01); *H04N 21/433* (2013.01); *H04N 21/437* (2013.01); *H04N 21/4825* (2013.01); *H04N 21/8549* (2013.01); *G06K 2009/00738* (2013.01)

(56) References Cited

U.S. PATENT DOCUMENTS

| | | |
|---|---|---|
| 2002/0120925 A1 | 8/2002 | Logan |
| 2006/0221184 A1 | 10/2006 | Vallone et al. |
| 2006/0282859 A1 | 12/2006 | Garbow et al. |
| 2008/0052612 A1 | 2/2008 | Hwang et al. |
| 2011/0075990 A1 | 3/2011 | Eyer |
| 2011/0217024 A1* | 9/2011 | Schlieski ............... G11B 27/00 386/290 |
| 2012/0263430 A1 | 10/2012 | Spitzer-Williams |

FOREIGN PATENT DOCUMENTS

| | | |
|---|---|---|
| EP | 2 216 788 | 8/2010 |
| GB | 2 452 315 | 3/2009 |
| WO | WO 02/080027 | 10/2002 |
| WO | WO 2004/025508 | 3/2004 |
| WO | WO 2005/057931 | 6/2005 |
| WO | WO 2005/093638 | 10/2005 |

* cited by examiner

VIDEO DATA PROVISION

This application is the U.S. national phase of International Application No. PCT/GB2014/000036 filed 31 Jan. 2014, which designated the U.S. and claims priority to EP Patent Application No. 13250024.0 filed 5 Mar. 2013, the entire contents of each of which are hereby incorporated by reference.

BACKGROUND AND SUMMARY

This invention relates to the provision of video data over a communications medium. In particular it relates to the capture and provision of video extracts or 'highlights' of a recorded or live broadcast programme for compilation into a short video sequence. The provision of such highlights is an important part of many television services, particularly in sports coverage.

The extracts required to compile a sequence of "highlights" clips are typically created from within a longer video sequence using standard digital video editing tools that define the start and end points of each video clip either directly or by reference to a key event within the clip. Each clip is typically saved as an independent file which can subsequently be provided to viewers. Typically a viewer requesting a "highlights" sequence is provided with an address, or set of addresses, from which to retrieve the clips that make up the required sequence.

It is known, for example from International Patent Specification WO2004/025508 to provided an automated procedure to identify 'highlights' within a video sequence in order to provide the viewer with navigation aids or to simplify and reduce costs in video production and editing. The prior art typically identifies video clips automatically through analysis of changes in video or audio levels within a video sequence. More specifically, the boundaries of the 'highlight' video segment are typically identified using various super-histograms, frame signatures, cut detection methods, closed caption information, audio information, and so on, by analysing the visual, audio and transcript portions of the video signal. For example, based on the volume of audience cheers (U.S. Pat. No. 7,831,112) recorded in response to the performance of the athletes, or analysis of the area of the image depicting the score to detect changes (U.S. Pat. No. 7,983,442). It is also known, for example from European Patent Application EP1421780, to provide for a viewer to manually bookmark a 'highlight' for later access.

These approaches define each video clip by specifying specific time-codes for its start and end. This approach to defining a highlight clip is inherently inflexible, in that it only defines the length of clip, with no further information regarding the key events within that clip such as a goal scored in a football match. Similarly, the definition of a clip by start and end points necessarily determines the length of each clip, and of the resulting sequence of highlights, which dictates the time required both to deliver and to view the entire sequence.

Standard video delivery mechanisms download video sequences in segments, delivered in sequence from the start to the end of each clip. Occasions can occur when, for example because of a loss of connection, a video clip could only be partially downloaded, consequently showing the build-up to, but not including the key moment of the actual goal (or save), match point (won or saved), catch (dropped or otherwise), putt (holed or missed) etc.

Such an interruption may also cause subsequent clips in the sequence to fail to be delivered altogether. This is a particular problem as the viewer will miss the climax and final outcome of the sporting fixture if the later clips are missing.

Different viewers may also wish to view "highlights" sequences of different duration, by varying the number and/or length of individual clips in the sequence.

The absence of information on key events within the clip also impedes intelligent delivery and playback when the clip is one of a series of clips which are to be played sequentially within a highlights show or playlist.

The present invention uses a novel method to identify and specify a 'highlight' within a video sequence, which can then be used to improve the delivery of video highlight clips and provide enhanced video playback facilities to viewers.

The present invention provides a method of generating video clips from a sequence of video data for delivery and playback on demand, wherein the sequence is made up of discrete elements of video data, wherein each clip is identified by an event marker and a pre/post event ratio, the event marker defining one of the discrete elements in the sequence, and the pre/post event ratio determines the relative relative proportions of the duration of the clip before the element defined by the event marker and the duration of the clip after the element defined by the event marker, and wherein, in response to a request for video clip data, identified with reference to the event marker, the discrete elements of video data making up each clip are allocated to a sequence starting with the element associated with the event marker and following in an order determined by the pre/post event ratio.

The invention also provides a video service platform for generating video clips from a sequence of video data for delivery and playback on demand, comprising:
  a video store for storing video sequences in the form of series of discrete elements of video data
  a retrieval system for retrieving the discrete elements of video data
  a client interface for receiving a request for a sequence of one or more video clips, each clip requested being defined by an event marker identifying an element of the video data,
  an event ratio determination processor for identifying a pre/post event ratio associated with each clip requested, the pre/post event ratio determining the relative relative proportions of the duration of the clip before the element defined by the event marker and the duration of the clip after the element defined by the event marker,
  wherein the retrieval processor is arranged to retrieve the discrete elements of video data, the order in which they are retrieved being, determined by the event markers and pre-post event ratios associated with the requested data such that the discrete elements making up each clip are allocated to a sequence starting with the element associated with the event marker and following in an order determined by the pre/post event ratio.

Complementary to the video service platform, the invention also provides a video service platform for generating video clips from a sequence of video data for delivery and playback on demand, comprising:
  a video store for storing video sequences in the form of series of discrete elements of video data
  a retrieval system for retrieving the discrete elements of video data
  a client interface for receiving a request for a sequence of one or more video clips, each clip requested being defined by an event marker identifying an element of the video data, an event ratio determination processor for identifying a pre/post event ratio associated with each clip requested, the pre/post event ratio determining the relative duration of the clip before and after an element defined by the event marker, wherein the retrieval processor is arranged to retrieve the discrete elements of video data, the order in which they are retrieved being determined by the event markers and pre-post event ratios associated with the requested data such that the discrete elements making up each clip are allocated to a sequence starting with the element associated with the event marker and following in an order determined by the pre/post event ratio.

In the preferred arrangement the pre-post event ratio is defined by the event marker. This allows different event types to be delivered in different ways.

The invention may be used to limit the overall duration of a clip or set of clips by dropping discrete elements from the clip in reverse order of the sequence. The invention may also be used to deliver the discrete elements in accordance with their positions in the sequence, thus ensuring that in the event of a loss of communication connection the segments that have been delivered before such interruption are the most significant for creating a shortened highlights sequence.

A plurality of clips may be generated, the elements forming the clips are formed into a single sequence determined by their respective event markers and pre-post event ratios.

In order to reduce the latency in delivery caused by the elements being delivered in an order different from that in which they are to be played back, elements forming one or more clips early in the order in which the clips are to be played may be delivered at a higher compression rate than elements forming subsequent clips.

Additional clips and event markers may be added to the database during delivery of video elements to a client device, the data elements relating to the additional clip being inserted into the delivery sequence according to the relative priority orders of additional clips and those forming the original sequence, thus allowing a "catch-up" service to be updated during delivery.

A predetermined maximum clip or sequence length may be defined in terms of the time taken to deliver the video elements, thereby defining a maximum download time, which prevents overloading a delivery system with low bandwidth. The predetermined maximum may instead be defined in terms of the duration of the sequence represented by the video elements, thereby defining the time taken to view the resulting video sequence. In either case, the delivery process may be terminated if connection with the requesting device is lost, but because the elements are delivered with the event marker first, the key moment defined by the event marker is present.

A plurality of clips may be delivered, the order in which the elements forming the clips are to be delivered being determined by their respective event markers and pre-post event ratios. Thus the elements forming the sequence of clips may be prioritised for delivery in an order corresponding to both the significance of the events identified by their respective event markers, and their relative proximities to their respective event markers.

This invention utilises a mechanism that allows prioritisation of video chunks (elements) based on their relationship to the event in order to flexibly deliver and render video onto a client device with respect to restraints in bandwidth or available time This invention uses an event time-code and knowledge of the event to define a video clip in terms of a single event time-code related to a key event within the video sequence, and a ratio. The ratio determines the relative durations of the clip before and after the instant identified by the time code. The event time-code can be further refined through the use of a user profile, and comparison to and aggregation of multiple 'Event Markers' provided by other viewers, as described in our co-pending application having applicant's reference A32513. In the preferred method, the receiving client device defines the duration of the clip, but in an alternative embodiment the definition and provision of clips may be undertaken by a network-based server based on knowledge of the end client, network connection and user, for example through the provision of a customised manifest file. The user device can therefore request clips from a server and composes the clips into a video sequence in accordance with the required durations of the clips.

The invention defines a video clip from a single 'bookmark', using metadata associated with the bookmark which enables the optimised delivery and dynamic compilation of sports video 'highlight' clips in bandwidth and time constrained situations. It also provides viewers with the ability to 'bookmark' favourite parts of a sports TV programme, enabling them to navigate to a specific event within the programme and share video clips.

The invention enables viewers to identify a number of key events within a video sequence (such as goals in a football match) using viewer-defined 'temporal bookmarks'. These bookmarks are stored as time-codes along with associated metadata which identifies the time-code as belonging to a certain type of event. A key benefit of this technique is that only one 'Event Marker' is required to create a highlight clip, where traditionally an 'in' and 'out' marker would need to be identified, specifying the start and end point of the clip. In particular, because the single "event marker" is used in conjunction with a ratio to identify the duration of the clip to be provided before as well as after the marked point, the user does not need to identify the beginning of the build-up to the event itself. A clip can be identified and generated easily and in real-time on a live video stream by a non-expert user through a single interaction at the moment of the key event.

A common approach to delivering video over HTTP (hypertext transport protocol) involves the dissection of large video files into multiple smaller files (called chunks), with each chunk corresponding to a segment of video perhaps a few seconds in length, and each with its own URL (universal resource locator). In such systems the a server platform provides a manifest file to the client, which specifies the URL of each chunk of the clip requested, so that the client can request, compile and then play back the video.

This invention utilises this delivery approach but modifies the way the manifest file is created and interpreted by the client device, so as to prioritise delivery of content based on its narrative importance.

For a 'sports highlights' show, the key events in a video sequence (such as goals) would be downloaded first, followed by further 'video chunks' in the sequence preceding and following each individual event. This enables 'highlight clips' to be provided in a flexible manner suited to the bandwidth available. This would be beneficial to viewers using low-capacity networks or those with unreliable coverage, for example a mobile user. This invention would allow the number of individual highlight clips made available to the viewer to be optimised in the presence of restrictions in bandwidth availability or connection reliability.

The prioritisation of video chunks would also enable video clips to be dynamically compiled 'on the fly' matched to specific play-back length restrictions. This facility may be useful when providing 'later-corner' catch-up facilities which would enable the viewer to be provided with a synopsis of key events which took place prior to joining the live stream.

BRIEF DESCRIPTION OF THE DRAWINGS

An embodiment of the invention will now be described, by way of example, and with reference to the drawings, in which.

DETAILED DESCRIPTION OF PRESENT EXAMPLE EMBODIMENTS

Figure 1:
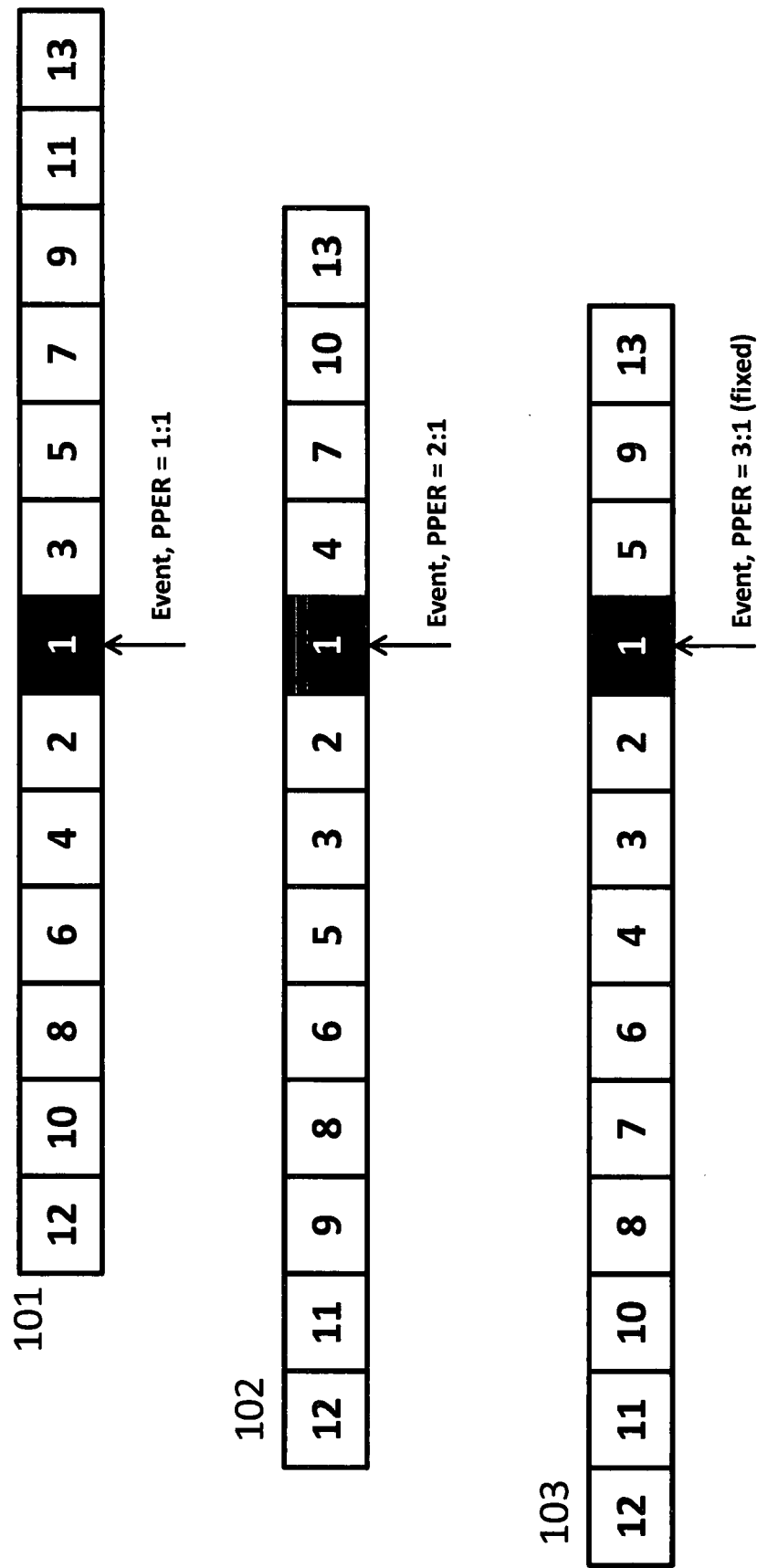
FIG. 1 depicts a number of different video clips created according to the invention.
Figure 2:
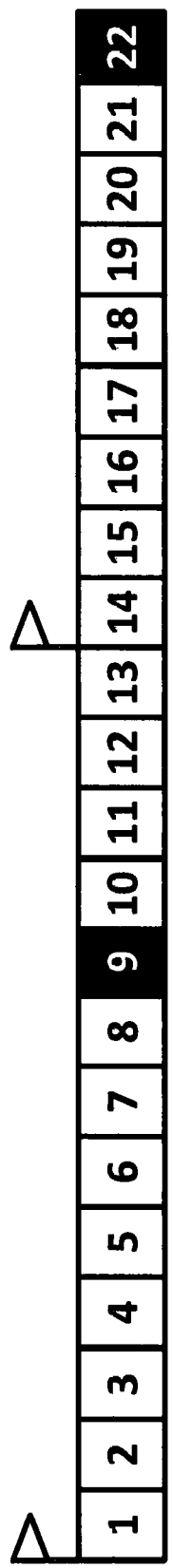
FIG. 2 depicts a conventional download sequence for a series of clips

It should be noted that the numbers 1, 2, . . . 133 etc in FIGS. 1 and 3 are priority levels, indicating the order in which the video chunks should be delivered to the client. (in particular in FIG. 3 more than one chunk has the same priority level). In FIGS. 2 and 7 the numbers indicate the (different) order in which they are to be presented—that is, in chronological order of the events they depict.

In the embodiment, a number of mechanisms are used to enable viewers to 'bookmark' events in sports TV programmes, and to enable service providers to utilise these bookmarks in the identification, delivery and provision of video highlight clips. The mechanisms outlined include:
1. Creation of a video bookmark and definition of a video 'highlight' clip. (FIG. 6)
2. Mechanism to deliver and compile video clips using a prioritised delivery schedule. (FIG. 4)

Creation of a video bookmark. (FIG. 6) A viewer can identify key events (such as goals) within a video sequence and mark them using 'temporal bookmarks'. These 'temporal bookmarks' can then be used by the viewer to navigate easily back to their favourite moments in the video sequence. Bookmarked events are stored as time-codes along with associated metadata provided by the viewer to classify the event. The metadata enables the individual video chunks to be prioritised for delivery and presentation by the video service provider.

Figure 4:
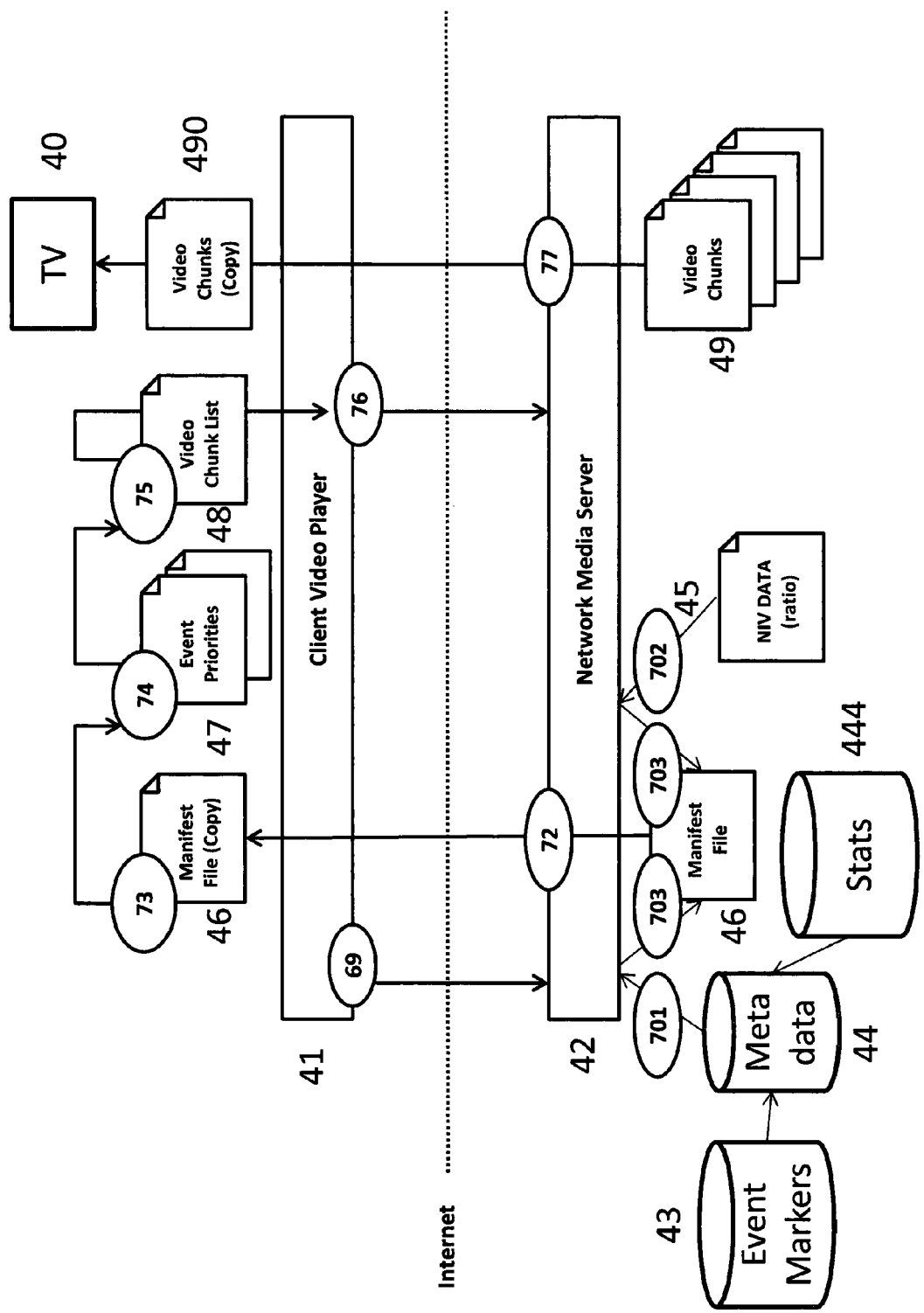
FIG. 4 depicts a media server and client server arranged to operate according to the invention, and also depicting the process used to compile video data into a clip sequence.
Figure 6:
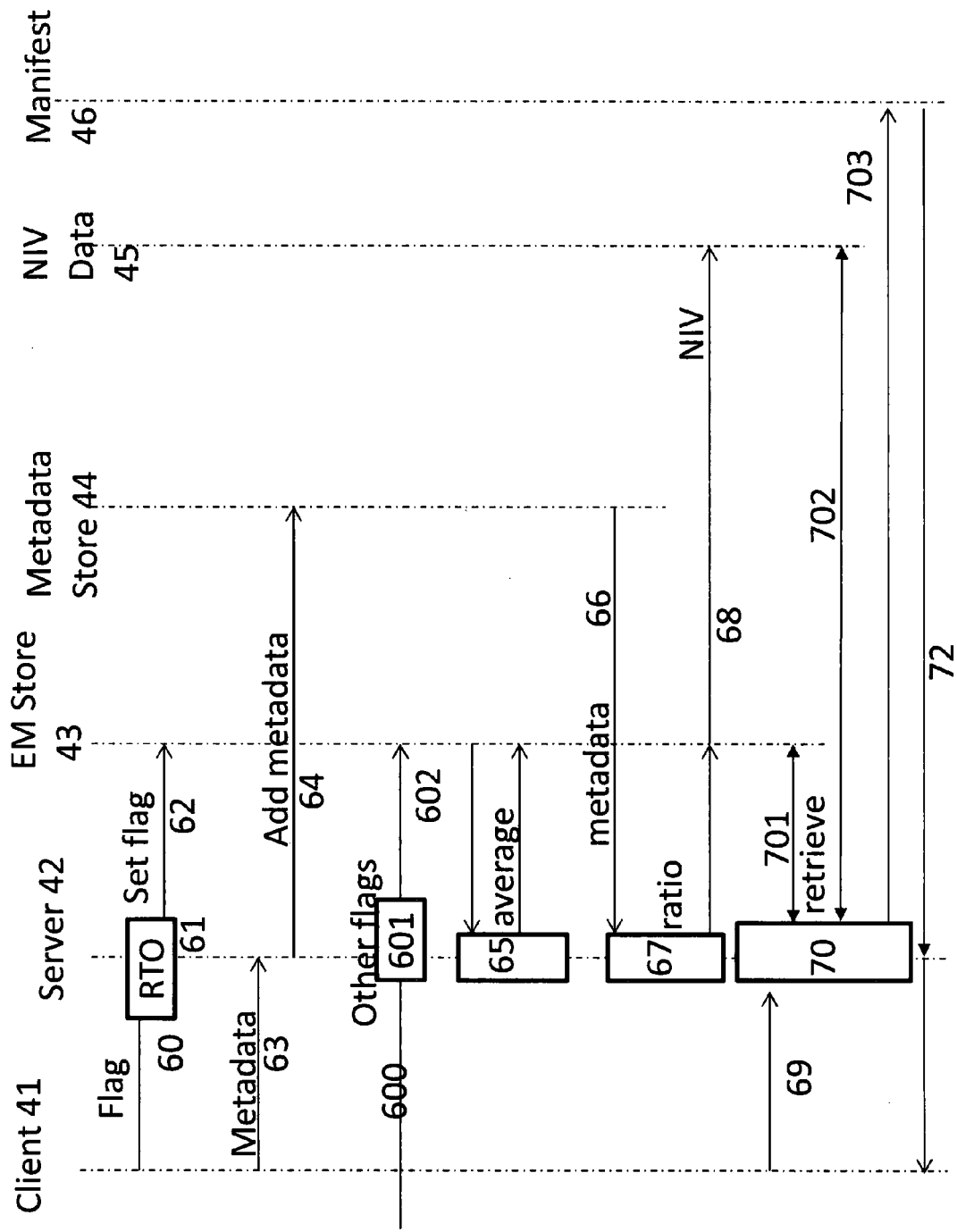
FIG. 6 is a flow diagram illustrating the processes performed in the operation of the invention

As shown in FIGS. 4 and 6, the viewer uses a video device 40 such as a television set to view broadcast or recorded video content such as coverage of a sports event. For ease of use the viewer may also be using a tablet device 41 or other terminal onto which has been loaded an application ("App").

A number of such applications are available which can synchronise such a terminal to the output of a video device 40 linked to a server 42 so that the server can monitor the content being watched by the viewer. The server also has data related to the content being watched. For example for a football match, it would have data on the identities of the teams and individual players. The App provides a user interface that enables the viewer to bookmark the video stream and add metadata to that bookmark.

The application loaded on the tablet device 41 allows a user to bookmark events in the television content and add metadata relating to that event, to be stored on the server 42. This enables the user to locate the event in order to share a video clip of it with other users using a social network, or to review the clip again after the event, or participate in a vote or competition which requires the nomination and submission of a clip.

The viewer 'bookmarks' the event by first selecting an action (goal, corner, etc). This creates an "event marker" The event marker is then saved to the server after metadata items, for example identifying the sportsperson involved) have been added This bookmarking process is identified collectively as step 60 in FIG. 6. Each event is identified using a single point in time within a video sequence, referred to herein as an Event Marker (EM). The EM would typically identify the exact moment of the event of interest, for example when a ball crosses the goal mouth, or the moment a bad tackle was committed. Each EM is specified by a time-code, frame or video chunk identifier within a video sequence.

The viewer may also provide additional metadata associated with the bookmark (step 63). This would include further information such as the type of event—(goal, pass, shot on goal, save, corner, red card, etc), the main primary person associated with the event—(Footballer, Referee, Manager, linesman, etc), and comments or descriptions the viewer may wish to add to the event to support later retrieval or to add context to the video clip.

Such metadata can also be created automatically to simplify the bookmark creation process. For example, using other data sources 444 (for example the real-time data feed provided by OPTA Sports Ltd) it would be possible for the system to provide data on which player had possession of the ball when the 'save bookmark' button was selected by the viewer.

The event markers and additional metadata are recorded in associated XML files 43, 44, (steps 62, 64) typically stored in association with the server device 42 so as to be accessible to both the viewer's Local Area Network and the video service provider.

There may be a mismatch between when the event actually occurred and when the user pressed the 'save bookmark' button. This mismatch can be reduced using either or both of the following methods.

The server 42 can modify the bookmark time-code by using a user-specific Reaction Time Offset value (RTO), (step 61) which attempts to minimise differences between when the event actually occurred and when the viewer indicated it occurred. The RTO for each user can be calculated by using reference video content in which event markers have previously been identified. The average difference between time-code for a reference event marker and the time code of the equivalent event marker identified by a viewer can be used to calculate a user's RTO. In FIG. 6 this process 61 is depicted as being performed by the server platform 42, but it could be done by the client device 41.

The bookmark time-code can be further improved through comparison with bookmarks (600, 601, 602) created by other viewers. By identifying a significant number of bookmarks saved by viewers within a short time range, and therefore likely to relate to the same event, and calculating a single representative value from them, a more accurate time code for an event marker can be calculated (step 65). This time-code adjustment process would take place on the server's centralised bookmark store 42 and returned to the event marker store 43. Such a system is described in more detail in our co-pending application A32513 referenced above This refined or aggregated bookmark is added to a bookmark list available to the application stored on individual client devices 41. Users may be given the option of using their own markers instead of the aggregated values. Bookmarks saved in the XML file are automatically uploaded to a centralised data store. The central data store can be used by viewers and TV production to identify and prioritise video clips for use in other applications such as a TV sports highlights programme.

The bookmark list available to an individual viewer can include bookmarks to which he has not himself contributed—for example he may have missed an incident because of interruptions in the data connection over which he was viewing live coverage. By using a value aggregated from all those who did see the coverage the user can obtain a more reliable event marker than if he relied on any individual event marker, e.g event marker 99.

The bookmark list can be filtered using the metadata tags, thereby enabling easy navigation and replay of video clips. Bookmarks can also be used as playlists, for example to enable a viewer to see all the goals within the match they have added to their bookmark list.

According to the invention, and as shown in FIG. 1, the bookmark (or Event Marker) "1" only defines a specific moment in time, around which a 'clip' can be defined. By dissecting large video files into multiple smaller files (called chunks), each being for example two seconds in length, a video clip can be defined by the number of chunks that occur before and after the Event Marker.

The chunks to be selected are determined with reference to two other properties. Firstly, a ratio before and after a single event time-code is determined (step 67) in accordance with metadata retrieved from the store 43 (step 66). This ratio is referred to herein as a Pre Post Event Ratio (PPER). The PPER determines the position within the clip of the time specified by the event marker—more specifically the ratio between the number of "chunks" to be provided preceding the EM and the number of "chunks" to be provided subsequent to the EM.

FIG. 1 shows three clips 101, 102, 103, each of thirteen "chunks" but with PPERs of respectively 1:1, 2:1 and 3:1. It will be seen that although in each case the clip has the same duration, the event marker (labelled as "1" in each case) occurs as—respectively, the $7^{th}$, $9^{th}$ or $11^{th}$ chunk in the sequence, and thus the start and finish times of these clips differ.

Different sports and sports-specific events would typically have different PPERs. Analysis of professionally created video clip sequences has identified average values for PPERs for the following sports:

Association Football has an average PPER of 1:3
Formula1 motor racing has an average PPER of 1:6
Rugby Football has an average PPER of 2:1

However, different ratios may be applicable to different levels at which the sport is played e.g. local league, national league and international level, both because of the different levels of proficiency and the different audiences. Different PPERs may also apply to different events (goals, rule infringements etc.) within a game, in particular according to the relative importance of the build-up to the key moment, and the consequences of that moment. In the case of set pieces, users may modify the bookmark after the event depending on the outcome (e.g. "hit" or "miss"), which may also affect its significance. The metadata stored (44) with the bookmark time (43) can be used to determine whether the instant the event is bookmarked is likely to be towards the beginning of the event of interest, or towards the end.

The value determined for the PPER ratio is used to generate a set of Narrative Importance Values (NIV) (step 68) for the individual chunks in a clip, which are maintained in a store 45.

The actual length of the clip, and therefore the start and end times of that clip, are not defined until a client device requests delivery of a video clip, as will be explained with reference to FIGS. 2, 3 and 6.

When a clip is requested by a user (step 69 and FIG. 4) a manifest file 46 is created within the network video server 42 (step 70) by retrieving the event markers 43 associated with the clips requested, and determining the network addresses of the individual video chunks to be delivered and their associated narrative importance values (NIV) 45 (steps 701, 702). The manifest file 46 is delivered to a client 41 requesting a clip (step 72), allowing the client to request the video chunks in order of their narrative importance value (step 76).

Delivery and Compilation of Video Clips Using the Prioritised Delivery Schedule (FIG. 4)

As shown in FIG. 1, the PPER can be used to specify in which order the video chunks are to be downloaded for a PPER of 1:1, 2:1 and 3:1 respectively. The Event Marker would always be identified as chunk number 1. As shown, the PPER would be used to identify the Narrative Importance Value (NIV) for each video chunk, which would then be used by the server to generate a video manifest file 46 which specifies the order in which individual video chunks would be requested by a client device video player application. So, for example, with a PPER of 1:1, chunks will be allocated NIVs in descending order at the same rate both before and after the event marker. For a PPER of 2:1 two chunks will be allocated before the EM for each chunk afterwards. Similarly for a PPER of 3:1—three chunks are downloaded preceding the EM for each one following it. In each case the chunks are downloaded in order beginning with the EM and proceeding chronologically away from it—this means that chunks that precede the EM are delivered in reverse order, requiring buffering until the sequence is complete or the download terminates.

An alternative delivery strategy could be employed for high bandwidth/reliable connections in which a fixed duration of playback is required. The NIV of each clip could be used to select chucks of video to make up the desired playback length. These clips can then be downloaded conventionally in chronological order thus simplifying the client by requiring little or no buffering or reassembly. For example, if each chunk is 1 second in length, and there are 6 clips each with equal importance and PPER, and the desired playback duration is 60 seconds, then the playback sequence should only be assembled from chunks with a NIV of 10 or less (60/6).

The result is that, however many chunks are downloaded, the ratio specified by the PPER is preserved as nearly as possible. It will be seen from the examples that although in each case the clip has a duration of 13 chunks, (e.g 26 seconds) the event marker occurs at different points within it—respectively, the $7^{th}$, $9^{th}$ or $11^{th}$ chunk in the sequence. Similarly, if the sequence is truncated before delivery is complete, the ratio specified by the PPER is preserved as nearly as possible given the fundamental granularity of the chunks (i.e fractions of chunks are not possible).

In adaptive HTTP streaming systems, such as DASH, a video sequence is split into equal chunks. Each chunk is encoded with a number of different qualities, allowing a client to dynamically choose a quality to suit the current available bandwidth. This strategy could be employed in this invention in situations where it may be desirable to shorten the time before playback of the first clip by playing it at a lower quality.

FIG. 4 illustrates the server and client apparatus which co-operate to perform the process, and the exchanges of data required. FIG. 4 depicts a client device 41 having an output to a television set 40 or other monitor device, and a connection over a communications network to a server 42. The server has a number of data stores 43, 44, 45, 46 which store event markers and other metadata associated with the video data, and manifest files for specifying which parts of the video data are to be delivered to individual clients, and in what order. The manifest files 46 may be created in response to specific requests from clients, or may be pre-prepared.

The client server 41 has a corresponding store for downloaded manifest files 46, and may also have a store of personalised priorities 47 for modifying the manifest file in order to prepare a request 48 for delivery of video content. The server platform 42 has a store of video content 49 from which is retrieved the content 490 specified in the request 48 for delivery to the client device 41.

A client device compiling a videoclip selects an identity (e.g by reference to its bookmark EM) and a desired duration (step 69). He may select a single clip or a series, defined either one-by-one or as a compilation defined by the user himself or by another user. In the case of a compilation the user may specify its overall duration, rather than the individual durations.

The length of the clip, or of each clip in the sequence, is defined by the receiving client device 41 which orchestrates the request of clips and the composition of a multi-clip video sequence for presentation.

If the clips are to be made into a compilation such as a "Highlights" show, the server uses the bookmark data associated with each event marker to determine a priority list. This list may be tailored towards the user's preferences—for example in a football game the user may give priority to viewing goals scored for the team he supports rather than those scored for the opposition, and may prioritise goals over other incidents such as events surrounding a caution or dismissal of a player.

The steps in the delivery process are as follows:

The client 41 requests a particular manifest file 46 from the server 42 (step 69), specifying one or more individual clips If not previously defined, the manifest file is compiled from the EM and NIV data (step 70—FIG. 6)

The server 42 delivers the manifest file 46 to the client 41 (step 72)

The Client 41 reads the manifest file 46 (step 73)

The client 41 interprets the manifest file 46, and applies the client's own Event and Personal Priorities 47 (step 74)

The client 41 creates a modified prioritised video chunk list 48, derived from the manifest file 46 as modified by the priorities 47 (step 75) specifying the video chunks in the order they are to be transmitted.

The client 41 transmits the chunk list 48 to the server 42 (step 76)

The server 42 retrieves the video chunks 49 and transmits them in the order specified in the request (step 77)

The client receives the video chunks 49 and reassembles them into chronological order for presentation to the user (step 78). In the event that not all the chunks are delivered 49, for example, because connection between the client 41 and server 42 is broken, the client device 41 assembles a shorter sequence from those it has received. All the chunks are stored, either for later playback or for near-immediate display: however, because the chunks preceding each event marker are delivered in reverse order to the order in which they are to be shown, display of the full sequence cannot start until all the pre-event chunks of the first clip have been delivered.

FIG. 2 illustrates how video chunks would be typically assembled by a client device to form a compilation of video sequences, in this case two video sequences 1-13 and 14-22. In this figure, the chunks are numbered in the order they are to be displayed. The flag icons indicate the divisions between the individual video clips. The chunks selected will be those which satisfy the required duration, ratio and EM.

Thus the first sequence (1-13) has a ratio of 2:1 and a duration of 13, and the second a duration of 9 chunks and a ratio of 1:0 (i.e the EM is to be the last chunk of the sequence, however long it is). On receipt of the chunks, the user device composes them into a set of video clips which together create a complete video 'highlights' show.

However, according to the invention, each chunk is allocated a value referred to herein as its NIV (Narrative Importance Value) and the order the chunks are delivered is determined in accordance with their individual NIVs. The order in which the chunks are delivered is therefore, in general, different from that in which they are to be assembled.

Figures 3A, 3B, 3C:
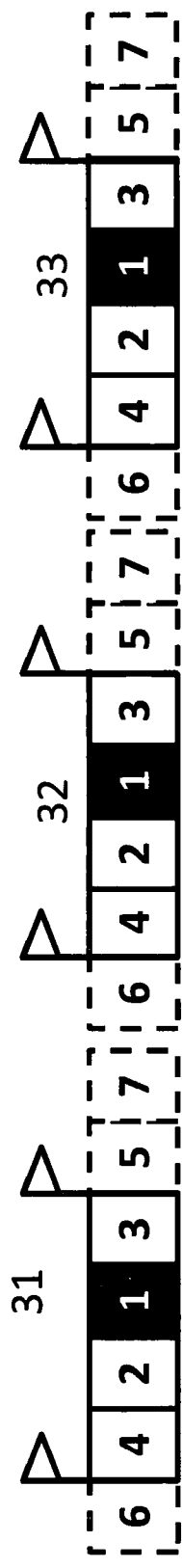
FIGS. 3A, 3B and 3C depict the download sequence for a series of clips according to the invention, for different download conditions.

FIGS. 3A, 3B and 3C illustrate how video chunks can be downloaded across multiple video clips in sequence. In this example the client device has requested a manifest file suitable for 'transient networks' where network connection cannot be guaranteed. Here the manifest file specifies an ordering of video chunks, relating to several video clips. In this example each clip has the same duration (7 chunks) and PPER ratio (1:1), but the principle can be extended to compilations of clips in which these values differ. This approach enables the key highlights to be prioritised.

In these figures the individual chunks are numbered in order of their NIV, and it is in that order that they are downloaded. Thus the server will first deliver the EM chunk from each clip (labelled "1"). When all the "1" chunks have been delivered, all the "2" chunks will be delivered, and so on.

FIG. 3A shows a partially downloaded video sequence compiled from three video clips (31, 32, 33). If the download were interrupted after only twelve chunks had been delivered a video sequence comprising three short clips 31, 32, 33 could be compiled by the player 41, and presented to the user. If the server 42 had instead delivered the chunks in the sequence in which they are to be played, an interruption after twelve chunks would result in the viewer only receiving, and being able to view, the entire first clip and part of the second, but nothing of the third clip.

Similarly, if the client application specifies a download of 24 seconds of video content, the client platform would stop the download after delivery of the highest priority four chunks (those with NIVs of 1, 2, 3, or 4) from each of the three video clips 31, 32, 33.

FIG. 3C shows the fully downloaded video sequence, if all the chunks were downloaded.

There are several uses to which this limitation process can be put. Mobile data users in areas of poor coverage may wish to prioritise data to ensure that the key moments are downloaded before connection is lost. A user on a pay as you go system, for example a mobile data user, may also wish to restrict the length of clip compilations in order to stay within his data access budget. One potential application of the invention is in the provision of highlights used in a catch-up facility for 'late comers' who have missed the start of a sports match, but are keen to see a précis of the key moments they have missed before watching the rest of the match in real time. In this case the download duration can be set to a predetermined period, but the number of clips to be inserted will depend on how many events have been bookmarked (by other viewers) up to that point. The duration of the "catch-up" download may be determined to be dependent on the amount of the video that has already been shown, in order that the end of the 'catch-up sequence' coincides with the return to watching the live match. Any further event that is bookmarked during the actual download time can be added to the sequence "on the fly", the high-priority chunks from the additional clip displacing the lowest priority chunks from earlier clips, that would otherwise have been downloaded last, in order to keep the total time of the catch-up sequence the same, so that the end of the 'catch-up sequence' coincides with the return to watching the live match.

This invention would enable the dynamic delivery of a compilation of predetermined length without having to pre-define the number of clips in the compilation, and even adding further clips to the compilation as the download progresses without changing the overall duration of the compilation.

Although as shown in FIG. 4 the chunks corresponding to each clip's respective event marker (EM) all have the same priority, this can be adjusted if the metadata associated with the EMs indicate that one clip is more important than another. So for example the EM of one clip may have priority "4" and another priority "1", so that four "chunks" of the second clip are downloaded before any chunks of the first.

For example, clips may be provided with a priority descriptor to be used by the server to define how video chunks may be prioritised within the manifest file. Such priorities may be determined according to several criteria, such as using the volume of bookmarks associated with an event to understand the level of importance and thereby change the priority and provision of individual video chunks (referred to herein as "Social priority").

Also, individual clients can interpret the manifest file and tailor their requests to the server to match the individual needs of the device and the preferences of the user. For example an event description (goal, pass, foul, etc.) can be used to prioritise delivery of the clip e.g. events such as goals would be higher priority than fouls. Ratings and the level of comments made about events may also be used to influence priority (referred to herein as "Event priority"). Using the personal preferences of the viewer such as which team they support, the delivery of video clips can be further prioritised according to those preferences, for example by omitting, or curtailing, clips relating to their opponents.

Figure 5A:
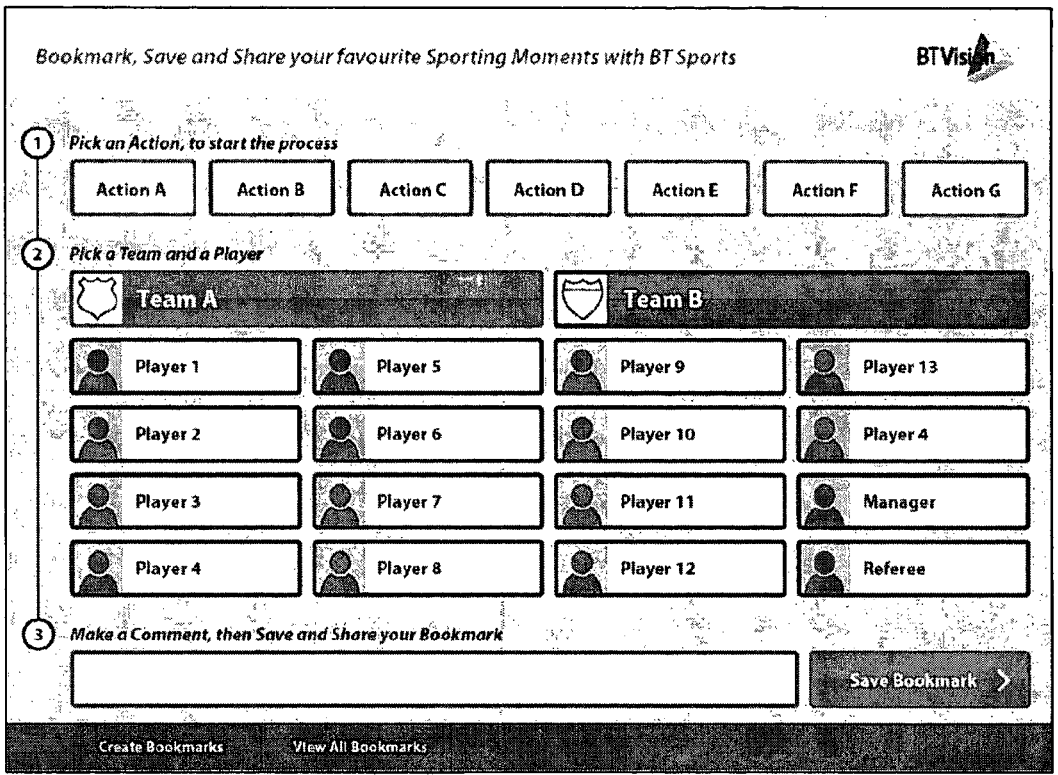
FIG. 5A depicts a display for use in creating bookmark metadata
Figure 5B:
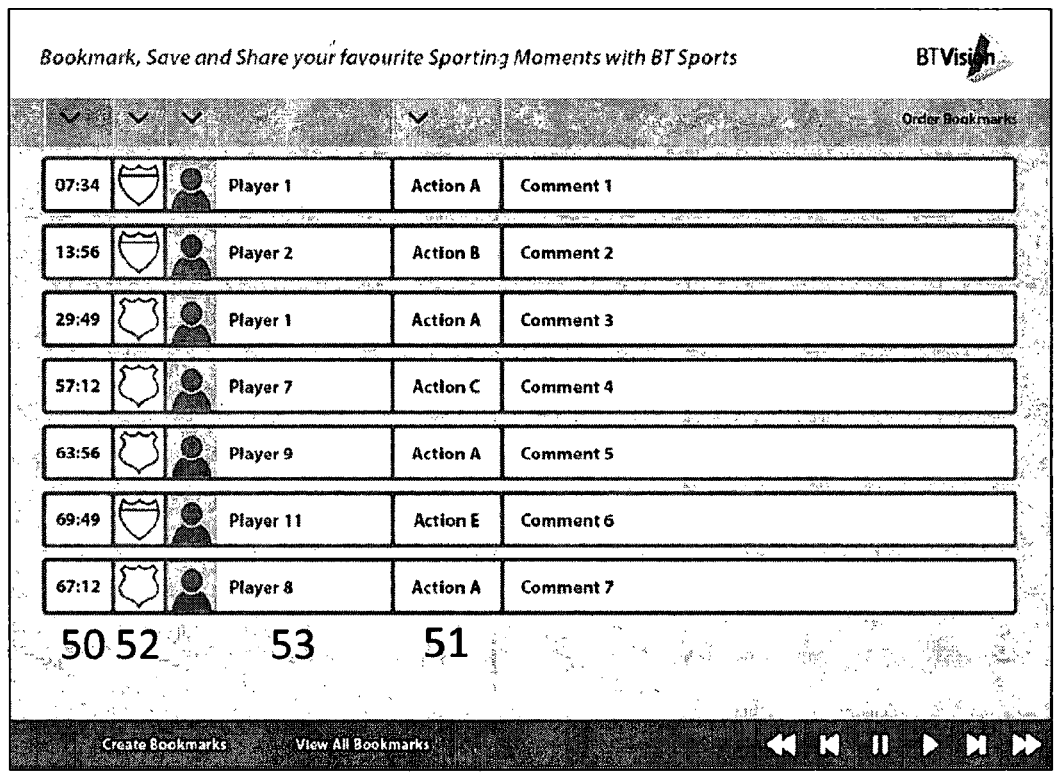
FIG. 5B depicts a display for use in navigating the bookmark metadata and playing back video clips

FIGS. 5A and 5B show the layout of a companion screen application to be used by the viewer. FIG. 5A shows the user interface to create temporal bookmarks. Having first called up the bookmark screen (which causes the time to be recorded) the user can then select an event type from a first menu 51 and other metadata (e.g team 52, or individual player 53) to be stored in the metadata store 44 associated with the event marker 43.

FIG. 5B shows a user interface for navigating bookmarks in order to compile a video clip sequence. A similar interface could be used in support of sports highlight programmes in which the events have been identified by another party or agency prior to download Individual event markers 50 are displayed in association with the metadata 51, 52, 53 recorded with them, with the facility to select one or more such events for download, for example by scrolling through the events and operating a select function for those required.

What is claimed is:

1. A method of generating video clips from a sequence of video data for delivery and playback on demand, wherein the sequence is made up of discrete elements of video data, wherein each clip is identified by an event marker and a pre/post event ratio, the event marker defining one of the discrete elements in the sequence, and the pre/post event ratio determines the relative proportions of the duration of the clip before the element defined by the event marker and the duration of the clip after the element defined by the event marker, and wherein, in response to a request for video clip data, identified with reference to the event marker, the discrete elements of video data making up each clip are allocated to a sequence starting with the element associated with the event marker and following in an order determined by the pre/post event ratio.

2. A method according to claim 1, wherein the pre/post event ratio is defined by the event marker.

3. A method according to claim 1, in which during playback discrete elements are dropped from the clip in reverse order of the sequence to limit the overall duration if the clip to a predetermined value.

4. A method according to claim 1, in which during delivery of video data the discrete elements are delivered in accordance with their positions in the sequence.

5. A method according to claim 1, wherein a plurality of clips are generated, and wherein the elements forming the clips are formed into a single sequence determined by their respective event markers and pre-post event ratios.

6. A method according to claim 5, wherein elements forming one or more clips early in the order in which the clips are to be played are delivered at a first, high, compression rate, and elements forming subsequent clips are delivered at a second, lower compression rate.

7. A method according to claim 5, wherein additional clips and event markers may be added to the database during delivery of video elements to a client device, the data elements relating to the additional clip being inserted into the delivery sequence according to the relative priority orders of additional clips and those forming the original sequence.

8. A video service platform for generating video clips from a sequence of video data for delivery and playback on demand, comprising:
   a video store for storing video sequences in the form of series of discrete elements of video data
   a retrieval system for retrieving the discrete elements of video data a client interface for receiving a request for a sequence of one or more video clips, each clip requested being defined by an event marker identifying an element of the video data, an event ratio determination processor for identifying a pre/post event ratio associated with each clip requested, the pre/post event ratio determining the relative proportions of the duration of the clip before the element defined by the event marker and the duration of the clip after the element defined by the event marker, wherein the retrieval processor is arranged to retrieve the discrete elements of video data, the order in which they are retrieved being determined by the event markers and pre-post event ratios associated with the requested data such that the discrete elements making up each clip are allocated to a sequence starting with the element associated with the event marker and following in an order determined by the pre/post event ratio.

9. A video service platform according to claim 8, arranged for delivery of video data such that the discrete elements are delivered in accordance with their positions in the sequence.

10. A video service platform according to claim 8, wherein the retrieval processor is arranged to transmit a sequence of video data to the client interface comprising a plurality of clips, and wherein the order in which the elements forming the clips are delivered is determined by a priority order determined by their respective event markers and pre-post event ratios.

11. A video service platform according to claim 10, wherein the video store is arranged to add additional clips and event markers to the database during delivery of video elements to a client device, the data elements relating to the additional clips being inserted into the delivery sequence according to the relative priority orders of additional clips and those forming the original sequence.

12. A client device for retrieving video data from a service platform for display as a sequence of one or more video clips, comprising:
a processing system, including a computer processor, the processing system being configured to:
generate and transmit requests for video clip data to the service platform, each video clip requested being defined by an event marker and a pre-post event ratio, wherein the pre-post event ratio determines relative durations of the video clip before and after an instant identified by the event marker,
receive the requested video clip as a sequence of video elements,
assemble the received video data elements into a sequence arranged according to the associated event markers and pre-post event ratios,
deliver the compiled sequence to a display device.

13. A client device according to claim 12, further comprising a storage device to store video clip elements when received by the processing system, to await delivery of other elements which are to be compiled for presentation at earlier points in the resulting sequence.

14. A client device according to claim 12, wherein the processing system is further configured to compile a sequence of a predetermined length by terminating receipt, by the processing system, of the requested video clip as the sequence of video elements when the number of delivered elements attains a predetermined number.

15. A client device according to claim 14, wherein the processing system is further configured to allow the number of clips within the sequence to vary dynamically during the receipt, by the processing system, of the requested video clip as the sequence of video elements, thereby allowing a clip added to the database during the receipt of the requested video clip to be added to the sequence within the predetermined sequence duration.

* * * * *